(12) United States Patent
Belashchenko

(10) Patent No.: US 9,376,740 B2
(45) Date of Patent: Jun. 28, 2016

(54) PLASMA SYSTEMS AND METHODS INCLUDING HIGH ENTHALPY AND HIGH STABILITY PLASMAS

(71) Applicant: Vladimir E. Belashchenko, Waltham, MA (US)

(72) Inventor: Vladimir E. Belashchenko, Waltham, MA (US)

( * ) Notice: Subject to any disclaimer, the term of this patent is extended or adjusted under 35 U.S.C. 154(b) by 0 days.

(21) Appl. No.: 14/876,225

(22) Filed: Oct. 6, 2015

(65) Prior Publication Data
US 2016/0024635 A1  Jan. 28, 2016

Related U.S. Application Data

(62) Division of application No. 13/771,908, filed on Feb. 20, 2013, now Pat. No. 9,150,949.

(60) Provisional application No. 61/608,426, filed on Mar. 8, 2012.

(51) Int. Cl.
| | |
|---|---|
| *B23K 10/00* | (2006.01) |
| *C23C 4/12* | (2016.01) |
| *B23K 10/02* | (2006.01) |
| *H05H 1/34* | (2006.01) |
| *H05H 1/42* | (2006.01) |

(52) U.S. Cl.
CPC ............... *C23C 4/127* (2013.01); *B23K 10/027* (2013.01); *C23C 4/134* (2016.01); *H05H 1/34* (2013.01); *H05H 1/42* (2013.01); *H05H 2001/3426* (2013.01); *H05H 2001/3452* (2013.01); *H05H 2001/3463* (2013.01); *H05H 2001/3478* (2013.01)

(58) Field of Classification Search
CPC ........ C23C 4/127; H05H 10/027; H05H 1/34; H05H 1/42; H05H 2001/3452; H05H 2001/3463; H05H 2001/3478; H05H 2001/3426

USPC ............. 219/121.36, 121.51, 121.52, 121.48, 219/121.54, 121.59
See application file for complete search history.

(56) References Cited

U.S. PATENT DOCUMENTS

| | | | |
|---|---|---|---|
| 4,841,114 A | 6/1989 | Browning | |
| 5,296,672 A | 3/1994 | Ramakrishnan et al. | |
| 5,726,414 A | 3/1998 | Kitahashi et al. | |
| 6,114,649 A | 9/2000 | Delcea | |
| 7,375,302 B2 | 5/2008 | Twarog et al. | |
| 7,491,907 B2 | 2/2009 | Kowalsky et al. | |
| 7,608,797 B2 * | 10/2009 | Belashchenko ......... | B05B 7/205 219/121.36 |
| 8,581,138 B2 * | 11/2013 | Kowalsky ............... | B05B 7/224 219/121.47 |
| 2006/0108332 A1 * | 5/2006 | Belashchenko .......... | H05H 1/34 219/121.47 |
| 2008/0167173 A1 * | 7/2008 | Lima ....................... | C09D 1/00 501/80 |

OTHER PUBLICATIONS

International Search Report and Written Opinion issued in International Patent Application No. PCT/US13/29814 dated Mar. 8, 2013.

* cited by examiner

*Primary Examiner* — Mark Paschall
(74) *Attorney, Agent, or Firm* — Grossman, Tucker, Perreault & Pfleger, PLLC

(57) ABSTRACT

The present disclosure generally relates to systems, apparatus and methods of plasma spraying and plasma treatment of materials based on high specific energy molecular plasma gases that may be used to generate a selected plasma. The present disclosure is also relates to the design of plasma torches and plasma systems to optimize such methods.

15 Claims, 16 Drawing Sheets

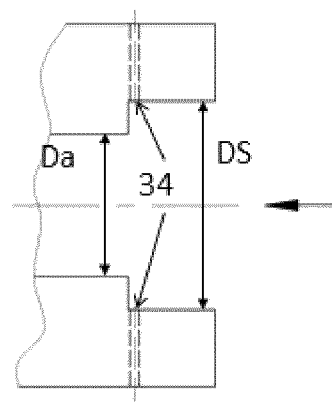 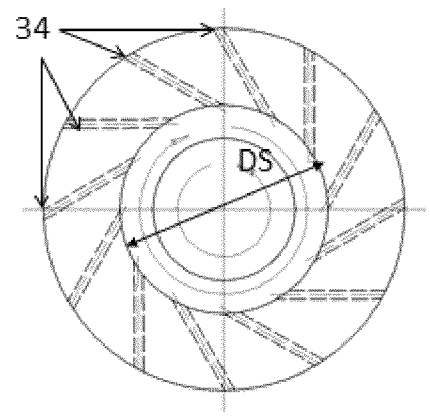
*FIG. 10a*  *FIG. 10b*

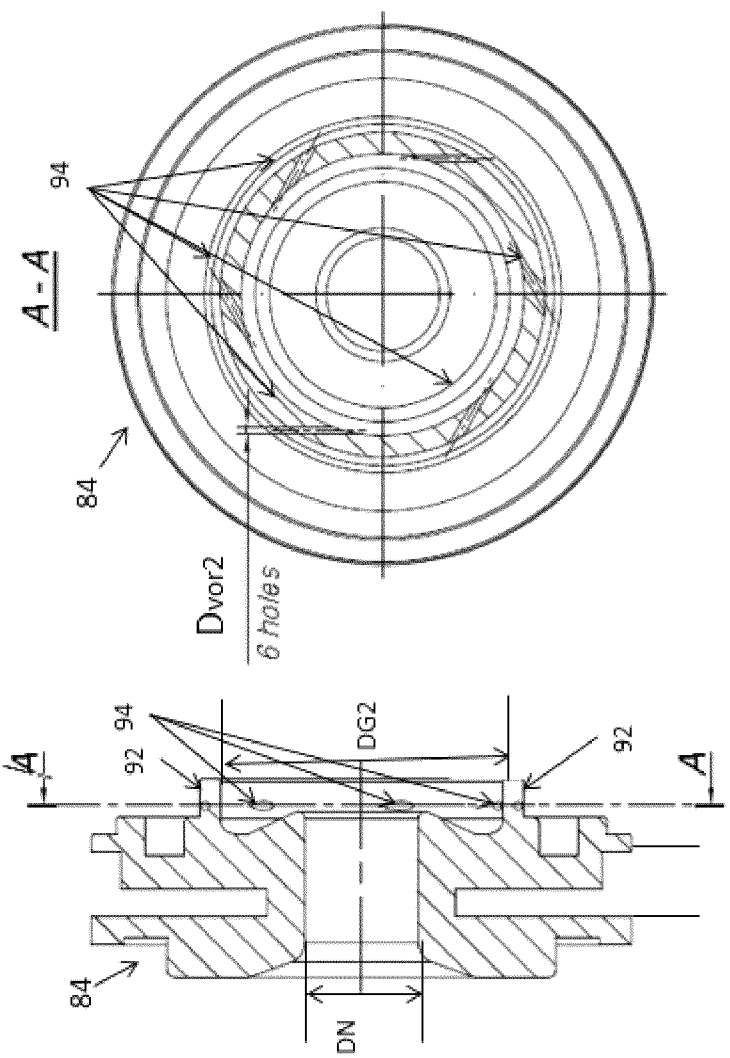

| Example Number | G1 Flow, L/min | | | G1 Total | S1 | Vort 1 | G2 Flow, L/min | | | G2 Total | Vort2 @S2=1.7 mm2 | Current | Gun Volt | Power | SP |
|---|---|---|---|---|---|---|---|---|---|---|---|---|---|---|---|
| | N2 | Ar | H2 | g/sec | mm2 | g/((sec)(mm²)) | N2 | Ar | | g/sec | g/((sec)(mm²)) | Amps | Volts | kW | kJ/g |
| 1 | 47.4 | 0 | 14.2 | 0.94 | 4 | 0.24 | 19.0 | 0 | | 0.37 | 0.23 | 350 | 260 | 91.0 | 69.5 |
| 2 | 38.0 | 19 | 11.3 | 1.28 | 4 | 0.32 | 14.2 | 8.5 | | 0.51 | 0.32 | 330 | 245 | 80.9 | 45.1 |
| 3 | 28.4 | 0 | 0.0 | 0.55 | 3 | 0.18 | 14.2 | 0 | | 0.28 | 0.17 | 250 | 202 | 50.5 | 61.1 |
| 4 | 38.0 | 0 | 3.0 | 0.74 | 3 | 0.25 | 14.2 | 0 | | 0.28 | 0.17 | 250 | 222 | 55.5 | 54.5 |
| 5 | 51.0 | 0 | 14.0 | 1.01 | 4 | 0.25 | 19.0 | 0 | | 0.37 | 0.23 | 260 | 262 | 68.1 | 49.4 |
| 6 | 25.0 | 0 | 12.0 | 0.50 | 3 | 0.17 | 15.0 | 0 | | 0.29 | 0.18 | 400 | 229 | 91.6 | 115.4 |
| 7 | 25.0 | 0 | 12.0 | 0.50 | 3 | 0.17 | 15.0 | 0 | | 0.29 | 0.18 | 460 | 230 | 105.8 | 133.3 |

*FIG. 15*

PLASMA SYSTEMS AND METHODS INCLUDING HIGH ENTHALPY AND HIGH STABILITY PLASMAS

CROSS-REFERENCE TO RELATED APPLICATIONS

This application is a divisional application of U.S. application Ser. No. 13/771,908, filed Feb. 20, 2013, now U.S. Pat. No. 9,150,949, issued Oct. 6, 2015, which claims the benefit of U.S. Provisional Patent Application Ser. No. 61/608,426, filed on Mar. 8, 2012, which is fully incorporated herein by reference.

FIELD

The present disclosure generally relates to systems, apparatus and methods of plasma spraying and plasma treatment of materials based on high specific energy molecular plasma gases that may be used to generate a selected plasma. The present disclosure is also related to the design of plasma torches and plasma systems to optimize such methods.

BACKGROUND

One major goal of plasma spraying and plasma treatment of materials may be generating of stable plasmas having a capability to control within a relatively wide range the heat and momentum transfer to feedstock, thus providing desirable parameters (temperature, velocity, etc.) of feedstock to form a deposition with required properties. Additional goals my include control of substrate temperature as well as other conditions of a deposit formation.

Heat transfer from plasma to feedstock may be characterized by Heat Transfer Potential (HTP) which is the major parameter determining plasma ability to heat particles and substrate:

$$HTP(T) = \int_{T_0}^{T} \lambda(T) dT$$

where $\lambda$ is plasma thermal conductivity; T is plasma temperature. HTP may have a correlation with plasma specific power (SP), plasma enthalpy H and plasma temperature. Plasma specific power SP, related plasma enthalpy H and thermal efficiency $\eta$ may be determined as follows:

$$SP = U^*I/Gp; \; H = SP^*\eta; \; \eta = 1 - Lw/(U^*I)$$

where Lw is power losses into cooling media (water); U is plasma torch voltage; I is plasma current; and Gp is plasma gas total flow rate. Specific power SP may be directly measured to characterize plasma conditions and further calculations of plasma HTP, H and temperature. So, SP will be used below for plasma characterization. It may be noted that sometimes power source or control system voltage readings are used as the torch voltage for the calculations. In this case calculated SP and H may be slightly above the real values due to a voltage drop in power cables connecting a power source with a torch.

FIGS. 1 and 2 illustrate the correlations between plasma HTP, H and temperature for argon and $N_2$ based plasmas with input data taken from the literature, such as Thermal Plasmas: Fundamentals and Applications, Volume 1, Boulos, Facuhais, Pfender, Plunum Press, New York (1994) ("Thermal Plasmas"). Generally, increase of plasma specific power and related enthalpy results in increasing of plasma temperature and HTP. However, for $N_2$ based plasmas, plasma temperature corresponding to a particular HTP and related enthalpy may be significantly lower than plasma temperatures corresponding to argon-based plasmas under the same conditions. This is due to the energy needed for the molecule dissociation. For instance, at HTP≈8000 W/m argon based plasmas may have temperatures exceeding 9000° K while nitrogen based plasmas temperature may be below 7000° K (see FIGS. 1 and 2). $CO_2$ and Air plasmas may have even slightly higher HTP in comparison with $N_2$ plasma at the same plasma temperature.

For the major part of plasma treatment of materials feedstock injection into a plasma jet generally takes place downstream of anode arc root attachment and, very often, even downstream of the plasma torch nozzle exit. It may be noted that HTP may decrease significantly downstream of the anode arc root attachment plasma jet due to plasma radiation as well as plasma mixing/interaction with ambient air downstream of the nozzle exit. Decreasing of HTP may result in decreasing of feedstock active dwell time $t_d$ when HTP value is sufficient for effective heat transfer from plasma to the feedstock. Intensity of plasma interaction with ambient air may be controlled by plasma velocity including velocity distribution as well as by radial and tangential components of plasma velocity. Plasma radiation heat losses Qr mainly depend on plasma temperature and may be estimated using a formula:

$$Qr \sim \epsilon(T,P) \sigma_{SB} T^4$$

where $\sigma_{SB}$ is Stefan-Boltzmann's constant; $\epsilon(T,P)$ is "degree of greyness" and $\epsilon=1$ corresponds to the "absolute blackbody" radiation. It may be noted that for the typical plasma-spray parameters $\epsilon$ is much less than 1 and rapidly grows with the temperature and pressure. Thus, the actual temperature dependence of the radiation flux could be significantly stronger than $T^4$.

Estimates may show that plasma jet radiates so intensively above plasma temperature T≈9000-10000° C. that all additional energy heating plasma above this temperature may be lost within 2-3 cm downstream to nozzle exit and plasma temperature may become there below T≈9000-10000° C. with related decreasing of HTP and enthalpy. Thus, based on FIGS. 1 and 2 as well as on Table 1 below it may be concluded that the HTP of Ar based plasmas having up to 20 vol. % $H_2$ may not exceed HTP≈7-10 kW/m at distances above 2-3 cm downstream of a nozzle exit. For Ar-50% $H_2$ HTP may achieve 14-16 kW/m. However, plasmas with more than 25-30 vol. % of hydrogen with Argon may have a significant pulsing of plasma parameters that their practical application may be very limited.

$N_2$ based plasmas may provide significantly higher HTP at the same temperatures utilized for Argon. For example, $N_2$—$H_2$ plasma having 20 vol. % of $H_2$ may provide HTP up to 18 kW/m before plasma temperatures may achieve T≈9000-10000° C. and the radiation may dominate in the energy balance thus resulting in extremely fast decrease of HTP. The same may be stated regarding plasmas based on other molecular gases like Air and $CO_2$.

TABLE 1

Plasma HTP and Enthalpy corresponding to 9,000-10,000 K plasma temperature for argon and nitrogen based plasmas

| | Plasma gas (vol. %) | | | | | |
|---|---|---|---|---|---|---|
| | Ar | Ar + 20 $H_2$ | Ar + 50 $H_2$ | $N_2$ | $N_2$ + 20 $H_2$ | $N_2$ + 50 $H_2$ |
| HTP, kW/m | 2-3 | 7-10 | 14-16 | 12.8-14.8 | 15.9-18.3 | 17.5-20.5 |
| H, kJ/g | 5-6 | 10-11.5 | 24-27 | 48-53 | 54.8-60 | 58-64.5 |

In addition, it has been observed that in the case of Ar—$H_2$ and $N_2$—$H_2$ plasma jets, it may be seen that length of high temperature/high HTP core part of Ar—$H_2$ plasma jet is significantly shorter than $N_2$—$H_2$ one due to intensive radiation. It may result in significantly shorter feedstock active dwell time $t_d$ and related lack of heat transfer to the feedstock. Thus, it may be concluded that only molecular gases based plasmas may be beneficial when high SP, H and HTP as well as long active dwell time are needed to achieve desirable properties of a deposit. However, it may be noted that molecular gases based plasmas may cause excessive wear of electrodes, plasma instability, pulsing and drifting. With respect to plasma systems, different approaches may be used to avoid or minimize these disadvantages. For example, different plasma passage configurations have been used to stabilize anode arc root axial position of the plasma apparatus thus minimizing voltage pulsation due to the arc shunting. Reference is made to U.S. Pat. Nos. 4,841,114 and 6,114,649. It may be noted that presently the PLAZJET® system manufactured by Praxair-TAFA and having maximum power of about 200 kW may generate stable high SP molecular gases based plasmas simultaneously providing long life of electrodes. For N2-$H_2$ plasmas maximum reported SP level may be of about 42.5 kJ/g.

SUMMARY

A method and apparatus for depositing a coating from a plasma torch comprising supplying a plasma torch generating voltage (U) above 100 V and current (I) below 500 A comprising a cathode electrode, an anode module having an anode electrode having an anode axis, entrance zone and a cylindrical zone having diameter Da wherein said plasma torch generates a plasma arc having an anode arc root attachment inside said anode. A plasma jet forming module is located downstream of the anode arc root attachment which forming module controls one or more parameters of the plasma jet in said module. An interelectrode module controlling the plasma arc passage between said cathode and said anode is supplied having one end adjacent the cathode module and a second end adjacent the anode module and having a pilot insert adjacent to said cathode. There is at least one neutral inter-electrode insert and the plasma torch further comprises two passageways to feed plasma gas in a total amount G wherein the plasma gas comprises more than 50 vol. % of molecular gas. One may then supply a feedstock into the plasma jet and deposit a coating on a substrate wherein one of the passageways for feeding plasma gas comprises a first plasma gas passage located between the cathode and pilot insert for feeding plasma gas in amount G1 wherein the gas is directed through a plurality of orifices having a surface area S1 wherein a vortex is formed having a vortex intensity Vort1=G1/S1. In addition, one of said passageways for feeding plasma gas comprises a second plasma gas passage located between said interelectrode module and said cylindrical part of anode for feeding plasma gas in an amount G2 wherein the gas is directed through a plurality of orifices having a surface area S2 wherein a vortex is formed having a vortex intensity Vort2=G2/S2. The value of G1 is greater than 0.6G and Vort1=G1/S1 is greater than 0.1 g/((sec)($mm^2$)) and wherein (U)(I)/(G) is in the range of 43 kJ/g-140 kJ/g.

BRIEF DESCRIPTION OF THE FIGURES

Features and advantages of the claimed subject matter will be apparent from the following description of embodiments consistent therewith, which description should be considered in conjunction with the accompanying drawings, wherein:

FIGS. 10 *a-b* illustrate radial feeding of additional gases into the stepped expansion of the plasma jet passage.

FIGS. 14 *a-b* illustrate an embodiment of the downstream neutral insert 84 having 6 vortex holes.

FIG. 15 contents information related to Examples 1-7

DETAILED DESCRIPTION

The present disclosure, as noted, relates to systems and methods of plasma spraying and plasma treatment of materials based on high specific energy plasma gases. Specific power molecular gas based plasmas with SP>43 kJ/g may now be achieved which may also improve heat transfer to feedstock and, consequently, improve deposit quality and overall process efficiency. Preferably, the specific power molecular gas based plasmas herein may include those with SP up to 120-140 kJ/g. Levels higher than 140 kJ/g even for nitrogen—hydrogen plasmas may result in plasma temperatures above 9,000-10,000K and all additional SP may be radiated.

Current above 500 A may cause excessive erosion of an anode when molecular gases are used. Thus, the present disclosure allows for the use of relatively high voltage above 100V and relatively low current below 500 A. This in turn may provide advantages in the generation of relatively high specific energy (>43 KJ/g) and related HTP plasmas. $N_2$, air and $CO_2$ based plasmas are the preferred molecular gases herein. However, $N_2$ based plasmas may be most preferred as they may not generate free oxygen in the plasma jet and result in some undesirable outcomes like relatively intensive oxidation of metallic alloys during spraying.

Figure 1:
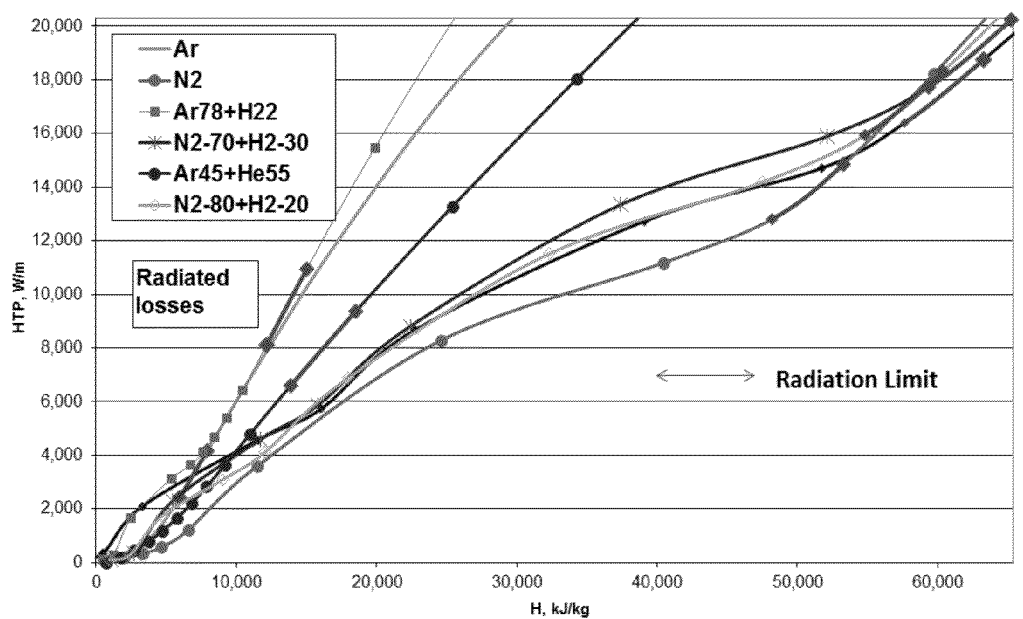
FIG. 1 illustrates a HTP correlation with plasma enthalpy (H) for different gases.
Figure 2:
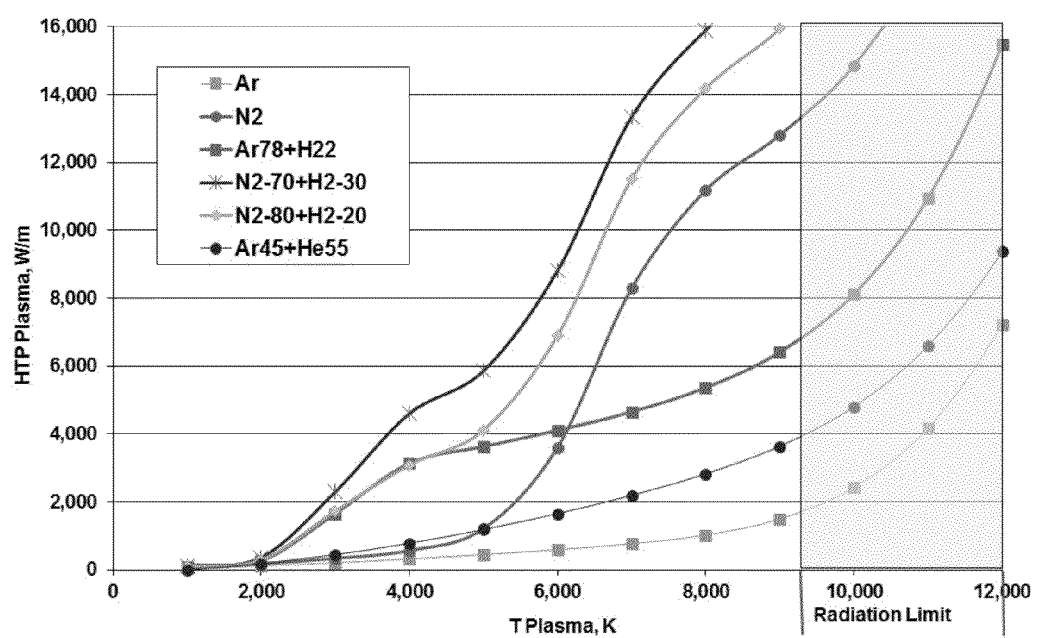
FIG. 2 illustrates a HTP dependence on plasma temperature.
Figure 3:
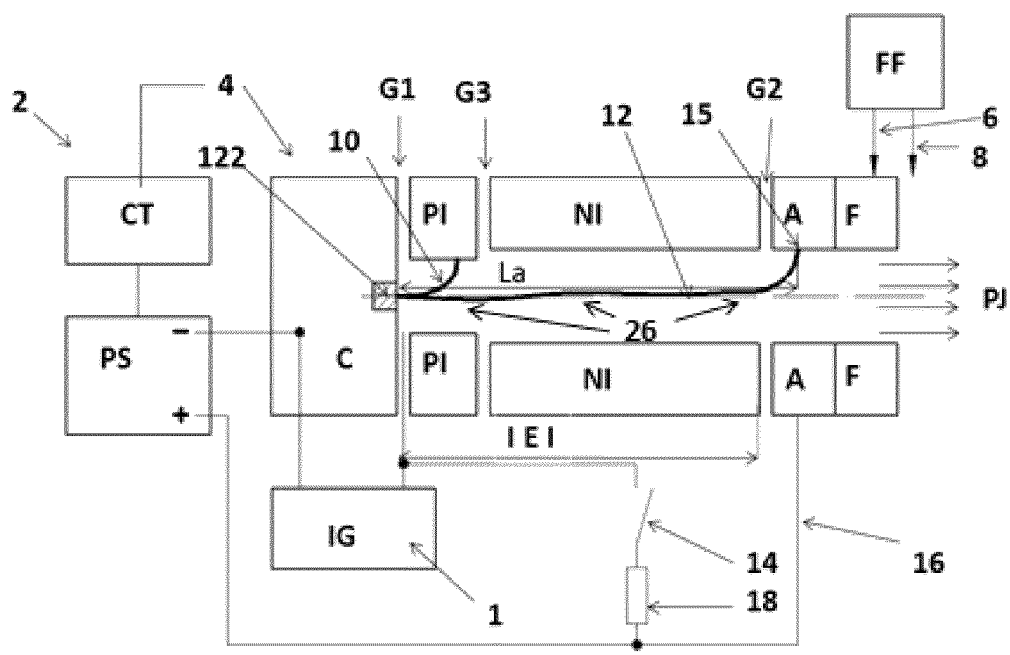
FIG. 3 illustration a schematic of a cascade plasma system.

FIG. 3 illustrates a schematic illustrate of plasma system for modification and optimization herein. As shown the plasma system 2 may generally be based on a plasma torch 4. The plasma system 2 may include a variety of modules. The plasma system 2 schematically depicted in FIG. 3 may include a DC power source module (PS); control module (CT), which may control plasma gases flow rates, the plasma current and voltage, sequence of events during plasma start up and shut down, etc.; plasma ignition module (IG) and ignition circuit 16. The plasma torch 4, itself, may include a cathode module C having at least one cathode 122; an inter-electrode inserts module (IEI) expanding and stabilizing the arc; and an anode module (A). Inter-electrode inserts module may include a Pilot Insert (PI), and at least one neutral inter-electrode insert (NI). A plasma jet forming module (F) may be located downstream of anode arc root attachment for shaping and/or controlling the velocity and temperature of a plasma jet (PJ) exiting the torch. The forming means may be arranged as a separate module electrically insulated from anode module (A) in this case. The plasma jet forming means (F) may be also angled, which may provide the possibility of spraying on internal surface of parts and inside other confined spaces. A Feedstock Feeding module (FF) may be provided for introducing a material feedstock into a plasma jet (PJ) of plasma generated by the plasma torch 4. The Feedstock Feeding module may be located downstream of anode arc root attachment and may feed feedstock into a forming means (position 6) or into a plasma jet (position 8). Material feedstock may be in a form of powder. It may also be in a form of liquid precursor or suspension of fine powders in liquids like ethanol or water. Solid feedstock like wire, rod, and flexible cord may be used as well.

A plasma gas G1 may be supplied to the cathode area, e.g., a space formed between the cathode 122 and pilot insert PI, through a passage inside the cathode module C. The plasma gas G1 may be the only gas used to generate plasma. Gp=G1 in this case.

A second plasma gas G2 may also be used to generate the plasma. The second plasma gas G2 may be supplied through a passage located between IEI module and Anode module as shown on FIG. 3. Still further additional plasma gasses may also be used to form the plasma. Such additional plasma gases may be supplied through passages formed in and/or between inter-electrode inserts. According to other embodiments, for example, a third plasma gas G3 may also be used to generate plasma. The third plasma gas G3 may be supplied through a passage between the pilot insert PI and the adjacent inter-electrode insert of the inter-electrode inserts module IEI. Gp=G1+G2+G3 in this case. G1, G2 and the additional gases may also reduce erosion of electrodes and inserts, undesirable possible arcing between various modules, pilot and neutral inserts and/or minimize erosion of electrodes, control plasma composition, etc. It may be noted that implementation of G3 and other possible additional plasma gases may result in the minor advantages dealing with the torch performance, however resulting in the torch design complexity and related maintenance and service challenges.

The cathode 122 may be connected to a negative terminal of a DC power source PS. In one embodiment, the DC power source may produce low ripple current, which may increase the stability of plasma parameters. A very low ripple may be achieved, for example, by using a ripple cancellation technique. An example may be DC power sources ESP-600C or EPP-601 manufactured by ESAB. During plasma ignition the positive terminal of the power source may be connected to the pilot insert PI through the ignition circuit 16.

According to an embodiment here, the ignition circuit 16 may include the ignition module IG, resistor 18, switch 14, control elements, capacitors, choke, and inductors (not shown). The ignition module IG may have a high voltage, high frequency oscillator. The oscillator may initiate a pilot electrical arc 10 between the cathode 122 and the pilot insert PI. The DC power source PS may be employed to support the pilot arc 10. The pilot arc 10 may ionize at least a portion of the gases in a passage 26 formed by sub-passages which may have different diameter for passage of plasma. That is, pilot insert PI may be of one diameter, neutral inserts (NI) may have other diameters, and the anode may define a particular diameter for plasma passage. The low resistance path formed by ionized gas may allow initiation of a main arc 12 in an arc passage 26 between cathode 122 and anode module A. The switch 14 may be disengaged after the main arc 12 has been established, thus interrupting the pilot arc 10. Consistent with one embodiment, several switches (not shown) may be connected to inter-electrode inserts to generate arcs between the cathode 122 and the inter-electrode inserts connected to the switches. Similar to the pilot arc 10, the arcs between the cathode 122 and the inter-electrode inserts may provide a low resistance path to facilitate initiation of the main arc 12, in the event that the length of the main arc 12 is greater than the capability of the ignition circuit utilizing only pilot insert PI.

Figure 4:
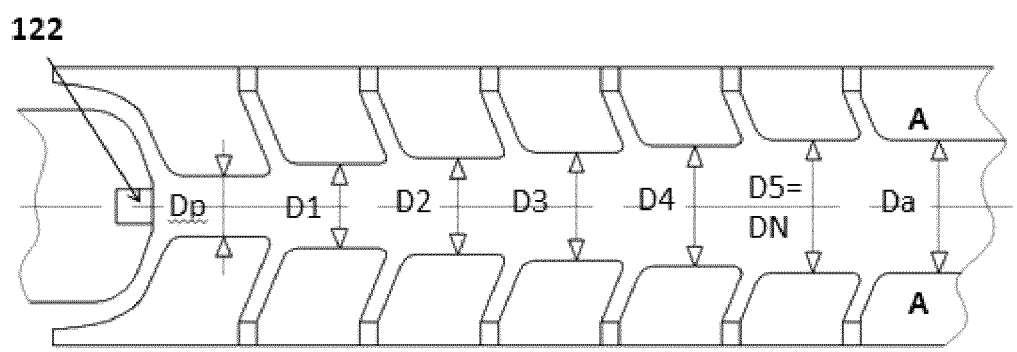
FIG. 4 illustrates a torch having expended plasma passage inside IEI module.

Plasma arc passage 26 may have different arrangements and options. Plasma passage inside PI may have diameter Dp and length Lp. FIG. 4 shows diameters Dp, $D_1$, $D_2$, $D_3$, $D_4$, $D_5$ up to DN. Plasma passages inside a neutral insert number "i" may therefore be designated to diameter D(i) and length Li. In some embodiments Dp may be the same or smaller than diameter D(1) of the adjacent (downstream) insert. Diameters of all neutral inserts (NI) may be the same as depicted on FIG. 3. Diameters of neutral inserts may also increase downstream providing D(i+1)≥D(i) as illustrated on FIG. 4.

The present disclosure now controls plasma passage diameter and profiles at the same plasma gases flow rates, SP and enthalpy which may now be a particularly effective tool to control plasma velocity separately of plasma temperature. For example, expanding diameter of plasma passage providing larger diameter of an anode may result in relatively lower plasma velocity in comparison with a cylindrical plasma passage having a relatively smaller anode diameter. Plasma velocity and related feedstock dwell time control may be very beneficial when different size of particles of the same material are needed to achieve different properties if deposits. One example is a porous thermal barrier coatings (TBC) sprayed by different size of yttria stabilized zirconia powders to achieve different porosity and pores size.

The plasma torch 4 may be capable of using a relatively high-voltage, relatively low current approach, which may suitably be used with a wide range of plasma gas flow rates, related SP, HTP and plasma velocity. Such a plasma torch may also be capable of realizing laminar, transition, and turbulent plasma jet flows. Generally, the plasma torch 4 may operate in a wide range of plasma current (e.g. 150 amps-500 amps). The length of arc (La) and related voltage values and their variations may depend on stability of arc in the area adjacent to cathode and inside IEI module, total length of IEI module as well as position of anode arc root attachment (15) inside anode. See FIG. 3. Length of the IEI module may depend on the amount of neutral inserts (NI) and their thickness (5.0 mm-25.0 mm). Position of anode arc root attachment may have axial instability and fluctuations due to arc shunting, which may result in undesirable voltage fluctuations and related instability of plasma jet parameters.

The present disclosure is therefore, now capable of generating plasmas with SP>43 kJ/g using gases having more than 50 vol. % of molecular gases. Such may then provide:

Specific Power (SP) and related parameters stability with long term variations (drifting) below 1% of the setup values Minimum pulsing of plasma voltage on a level below 5-10 volts Capability to control plasma jet velocity and temperature, effective, homogeneous treatment of feedstock, high deposit efficiency and deposit quality Several variables may be now considered and optimized to achieve one or more of these features. These variables are:

1. Plasma Current

The initial consideration is plasma current. In the context of the present disclosure, plasma current may be preferably at or below 500 A, and in the range of 150 A to 500 A. Such current levels may provide relatively long life of the electrodes. The most preferable range of current is 200-400 A. At current above 500 A even high efficiency gas swirls may not provide sufficient rotation of anode arc root needed to control the heat flux especially to anode. Thus, additional, for example, electro-magnetic means to rotate the arc may be needed to provide long life of a torch at current above 500 A.

As current may be controlled to preferably less than 500 A, voltage U may now be preferably controlled and adjusted in accordance with the needs regarding plasma specific power $SP=U*I/Gp$ for a particular plasma gas and flow rate. Again, SP is preferably >43 kJ/g. Voltage control may be done most preferably by controlling the arc length which depends on the total length of the IEI module. Additional less preferred voltage control may be also used. For example, relatively smaller diameter of plasma passages formed by a pilot insert and/or neutral inserts may result in relatively higher voltage.

2. Cathode Gas (G1) Having Tangential Component (Vortex)

The stability of the arc in the area adjacent to cathode and inside IEI module may be achieved by providing G1 having a tangential component of velocity, thus creating vortex in the area located between the cathode and pilot insert. The vortex may propagate downstream along plasma arc area thus may cause stabilizing of the arc additionally to wall stabilization by IEI.

In the present disclosure, the G1 flow rate may now be more than 60 vol % of total plasma gas flow rate, which means G1>0.6 Gp, to preferably support the vortex propagation along the plasma channel inside the IEI module. See again, FIG. 3. The vortex intensity may be characterized by a ratio Vort1=G1/S1 where S1 is a surface area of the G1 vortex orifices.

At relatively small G1 flow rates corresponding to SP>43 kJ/g useful stabilization of the arc may be observed for the vortex generated by G1, namely when Vort1>0.1 g/(sec*mm$^2$). Plasma gas flow is measured in g/sec and surface area is measured in mm$^2$ to calculate the vortex intensity. Other units of measurements may be used as well with related changes in the calculated values of vortex intensity. Generally, higher intensity of the vortex velocity may result in better stabilization of the arc and the intensity of the vortex may be limited by sonic velocity of plasma gases. Higher velocity of the vortex may also result in higher available plasma velocity control rate ($\Delta$), which is described more fully below.

3. Anode Plasma Gas (G2) Having Tangential Component (Vortex) to Rotate Anode Arc Root Attachment Use of only G1 at certain flow rates may not be sufficient for the anode arc root attachment rotation and stabilization when relatively low plasma gas flow rates are needed to generate high SP plasmas (>43 kJ/g). It may be explained by downstream decrease of the vortex intensity due to viscous plasma flow inside the plasma channel. Decreasing of vortex intensity may also limit available plasma velocity control rate. Insufficient vortex in the area of anode arc root attachment may result in both unstable arc root rotation and related short life of anode as well as excessive axial fluctuation of arc root position resulting in excessive pulsing of plasma jet.

The above disadvantage (unstable root rotation) may now be minimized or completely avoided by providing G2 with a tangential component of the gas velocity providing the same rotation direction as G1, which occurs before the anode arc root attachment. Positive effect of G2 addition to G1 may be observed from some minimum value G2,min. The minimum flow rate G2,min which may be needed for efficient anode arc root rotation may depend on anode diameter Da and may be defined as G2,min=(0.01-0.025)Da where Da is measured in mm and G2 is measured in g/sec.

Minimum vortex intensity related to G2 may be on the same level as for G1, i.e. Vort2>0.1 g/(sec*mm2) However, G2 flow may be lower than 0.4 Gp in this case which may follow from G1>0.6 Gp. The techniques to feed G2 into the plasma channel may be preferably located relatively close to the anode arc root attachment, preferably 3-25 mm upstream of the arc root attachment. Thus, by feeding G2 close to the anode arc root attachment, a minimum or no decrease of vortex intensity in the area of arc root attachment may be expected which may result in relatively long life of an anode.

G2 maximum vortex intensity may be estimated as Vort2 (max)=0.4 g/(sec*mm2). Increasing of Vort2 above this level may not be desirable and may result in excessive tangential component of plasma jet velocity and related disadvantages dealing with material feedstock precise feeding into the desirable areas of plasma jet. Thus, the vortex range of intensity may be disclosed as 0.4 g/(sec*mm2)>Vort2>0.1 g/(sec*mm2). Combination of G1 and G2 vortices with the disclosed flow rates and intensity may already result in relatively high stability of plasmas having SP>43 kJ/g

4. Methods to Stabilize Anode Arc Root Position

It is preferred to now arrange the transition zone 24 in the plasma passage between IEI module and cylindrical part of an anode with simultaneous positioning of G2 vortex feeding methods inside the transition zone. This may result in further decrease of the arc instability and pulsing within wide range of operating parameters including parameters providing specific power SP>43 kJ/g.

Figure 5:
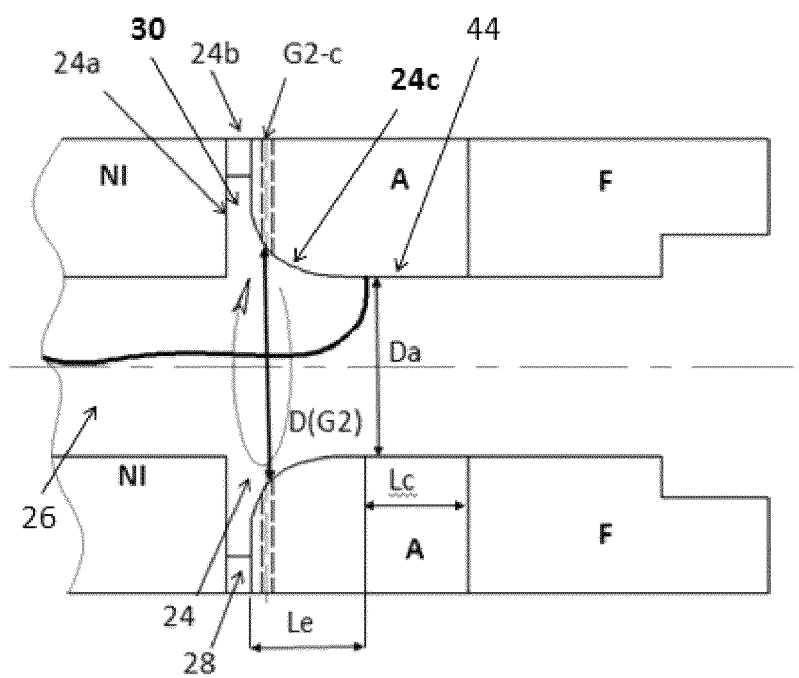
FIG. 5 illustrates one of possible embodiments of a transition zone (G2 feeding into upstream area of anode entrance zone).

FIG. 5 illustrates one of the preferred embodiments of the transition zone 24 which may include an expansion 30 downstream of the end of plasma passage 26 inside of the IEI module. The expansion 30 may therefore be configured such that a discontinuity occurs in the passage 26 thereby causing a distortion in the plasma flow. Preferably, the flow of plasma is distorted due to the feature that the zone 24 includes an expansion surface 24a to provide a diameter increase in the plasma passage.

A ceramic ring insulator 28 is positioned in a slot 24b between the IEI module and the anode module A. The anode has an entrance zone 24c and cylindrical portion 44 and diameter Da associated with cylindrical portion 44. Preferably there are minimum or no losses of G2 vortex intensity in transition zone 24. Slot 24b may be approximately 1.5-3 mm wide and may as noted contain the ceramic ring 28 insulating the IEI module from the anode module.

Figure 6:
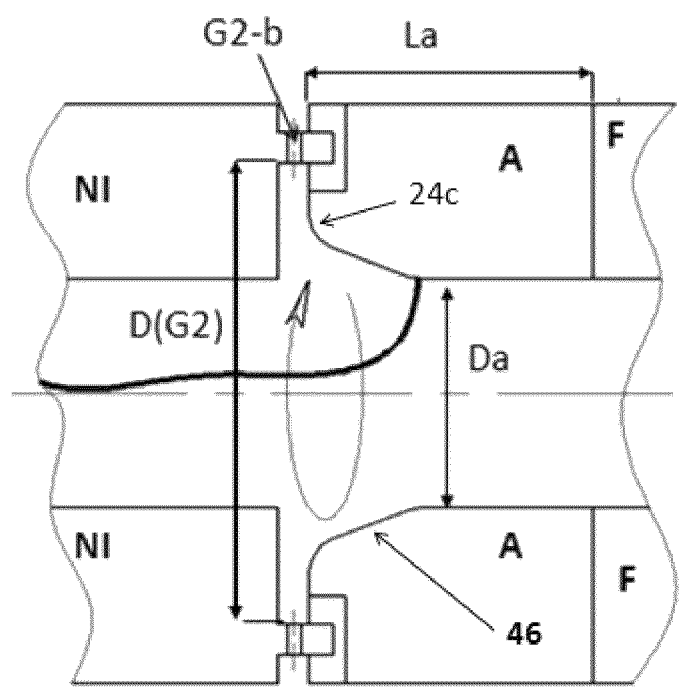
FIG. 6 illustrates one of possible embodiments of a transition zone (Conical portion of the anode entrance zone and G2 feeding into a slot).

Length Le of the anode entrance zone 24c may be of the same order as Da and Le and may be preferably defined as Le=(0.5-1.5)Da. G2 swirl plasma gas may be fed in zone 24b (G2-b) and/or in zone 24c (G2-c) which is illustrated in FIGS. 5-6. The anode entrance zone may have different geometric shapes. For example, FIG. 6 illustrates a conical portion 46 of entrance zone 24c while FIG. 5 illustrates a rounded entrance zone 24c. It should be noted that G2 orifices may locate on diameter D(G2) illustrated in FIGS. 5-6 which preferably are at least 2-3 mm larger than anode diameter Da.

Analysis of ID anode surfaces may reveal that the anode arc root attachment locates preferably near or on the upstream portion of the cylindrical portion 44 of the anode. The maximum observed downstream position of anode arc root attachment may be preferably characterized by Lc which is illustrated in FIG. 5. As a rule, Lc<(1-1.5) Da. Thus, total anode length La=Le+Lc may be estimated as La=(1.5-3)Da and the area located downstream of the maximum value of La serves as the plasma jet forming portion F.

It was surprisingly observed that introduction of the transition zone together with the disclosed above specifics of swirls G1 and G2 may result in the capability to control significantly plasma passage diameter and profiles within a relatively wide range at the same plasma gases flow rates and plasma thermal conditions including plasma SP, HTP, enthalpy and temperature. It may be an effective tool to control plasma velocity without significant variations of plasma thermal conditions. FIG. 4 illustrates one of possible plasma passage profiles which may be used to realize independent plasma velocity control. In this embodiment Dp>D1>D2>D3>D4>D5. Symbol DN may be also used for the diameter of the last downstream insert of IEI module which is adjacent to an anode (insert #5 on FIG. 4).

Rate of the available velocity control ($\Delta$) may be determined as a ratio between maximum plasma velocity Vmax and minimum plasma velocity Vmin achievable by a plasma spraying method at particular thermal conditions of plasma. Thus, $\Delta$=Vmax/Vmin. Higher available $\Delta$ may result in improved capability of the plasma spraying method herein, along with wider operating windows and related practical benefits. The velocity of plasma exiting an anode may be approximately proportional to 1/(anode surface area), i.e. V~1/Da$^2$. Thus, $\Delta$ may be estimated as $\Delta$=(Da,max/Da,min)$^2$ where D(a, max) and D(a, min) are maximum and minimum diameters of the cylindrical part of anode which may be achieved by preferably controlling the plasma passage profile and diameter with no or relatively minor changes in the plasma thermal conditions. The following data regarding the rate of velocity control ($\Delta$) and related parameters were obtained based on a plasma torch used for the methods herein.

Available variation of Da still providing relatively stable arc may be estimated on a level of Da=(0.8-1.25)DN which gives $\Delta$=(1.25/0.8)$^2$≈2.4. Higher rate between Da and DN in this case may cause plasma instability. Thus, additional profiling of plasma passage may be needed when higher rates of plasma velocity control is needed Additional profiling of the plasma channel may allow achieving $\Delta$≈3.65 for Da,min of about 6 mm and Da,max of about 11.5 mm. It may be also noted that Da,max=11.5 mm was limited by a particular design of the torch where dimensions of the anode housing may not yield an anode with Da>11.5 mm. So, it is contemplated that higher values of $\Delta$ may be achieved if needed by scaling up the design of the anode housing and related dimensions of the anode.

5. Means to Minimize Tangential Component and Equalize Plasma Temperature and Velocity Profiles Effective plasma arc stabilization and anode arc root rotation by swirls G1 and G2 disclosed above may result in the high relative intensity swirling flow of the plasma jet downstream of the anode arc root attachment. In this case a relatively excessive tangential component of the velocity of the plasma jet may consequently result in excessive mixing of plasma jet with ambient air, related shortening of high HTP core part of plasma jet and decreasing of active feedstock dwell time td as well as resulting decreasing of efficiency of feedstock treatment in the plasma jet. Thus, it may be very desirable for various applications to have a plasma jet forming portion located downstream of the anode arc root attachment which may minimize the tangential component of plasma jet velocity.

The minimized tangential component may then result in relatively minimized mixing (interaction) of the plasma jet with surrounding media (air) and, consequently, relatively longer high temperature maintenance of the jet and relatively longer active dwell time. A relatively minimized tangential component may also result in better controllable feedstock injection into desirable areas of plasma jet and, thus, better deposit quality and deposit efficiency. Different additional requirements to plasma jet parameters may also request additional different configurations of a forming nozzle.

Figure 7:
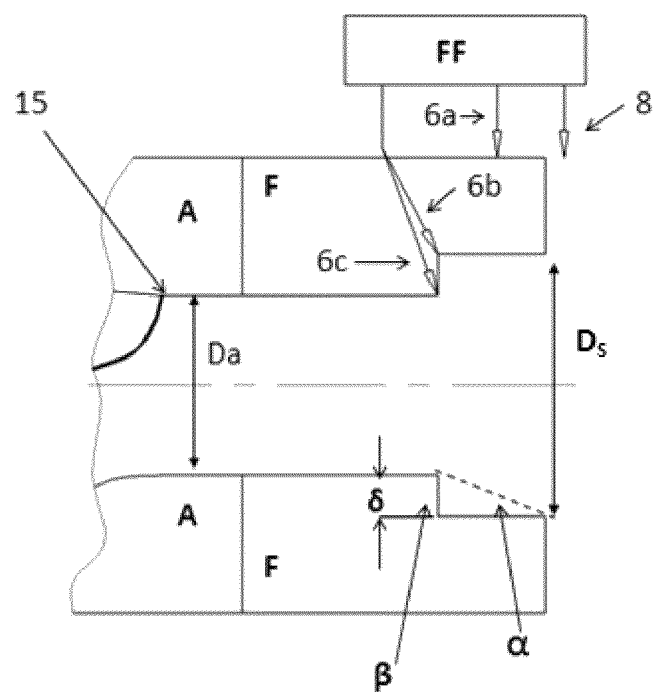
FIG. 7 illustrates a plasma jet forming module.

Abrupt stepped expansion of the plasma jet passage diameter from Da to Ds with a following cylindrical plasma jet passage having diameter D$_S$>Da may be an efficient way of decreasing the plasma tangential component. This expansion may be characterized by step angle $\beta$, expansion ratio $\delta$, and expansion angle $\alpha$ which is illustrated by FIG. 7. Step angle $\beta$ may be of about 90° with acceptable variations of about +/−10°. Generally, it may be expected that higher jet expansion angle $\alpha$ and larger expansion rate may result in lower tangential component of velocity of plasma jet exiting the forming nozzle. However, surprisingly it was found that jet expansion angle $\alpha$>25° may also result in the shortening of plasma jet which may be explained by a significant amount of ambient air which may penetrate inside the over expanded nozzle and have a negative influence on the jet formation. Additionally, it was found that decreasing of the expansion angle $\alpha$<8° may not result in sufficient decreasing of the plasma velocity tangential component. However, it may result in the increasing of the nozzle length and, therefore, it may result in additional heat losses due to the heat exchange between the nozzle wall and plasma. Thus it may be concluded that a positive effect of the swirl decreasing may be expected within the preferred range 8°>$\alpha$>25°. The most pronounced effect may be observed within $\alpha$≈10-18°.

Optimum expansion ratio $\delta$ may be understood as 0.2 Da<$\delta$<0.6 Da. At $\delta$<0.2 Da decreasing of the tangential component may be relatively insignificant or even may not be observed. At δ<0.6 Da further decreasing of the tangential component was not observed. However, further increasing of the related nozzle length may result in the increasing of heat losses already described above. It may be noted that such a stepped expansion of the plasma passage may also result in equalizing of plasma jet temperature and velocity across the jet profile which may result in further improvement of homogeneity of treatment of feedstock powders or suspension, etc, high deposit efficiency and deposit quality.

Figure 8:
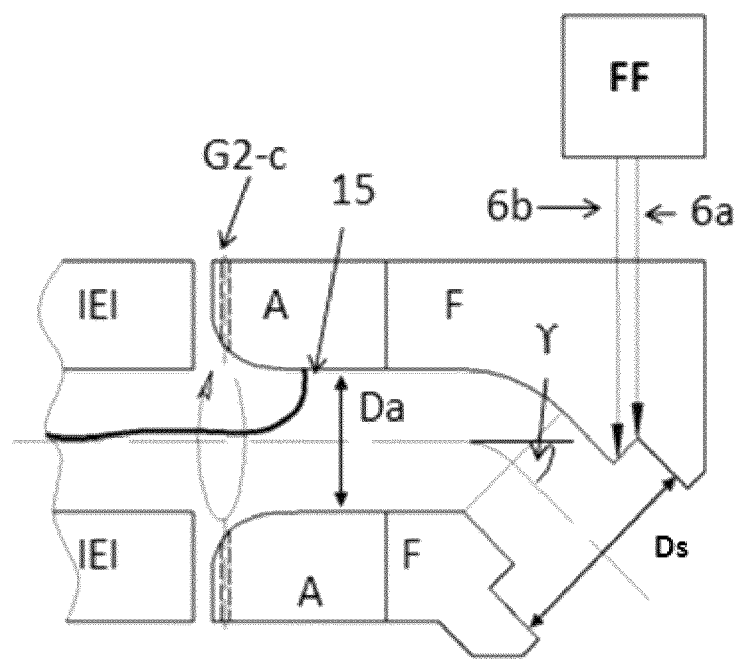
FIG. 8 illustrates a plasma jet "angled" forming means.

The stepped expansion of the plasma jet passage may be located under angle γ to the anode axis which illustrated by FIG. 8. Angle γ may vary within 0-90° based on a technology requirements. Generally, γ may preferably be within 45°-80°. A variety of feedstock feeding options may be utilized by the method which is illustrated on FIGS. 7 and 8 (positions 6a-6c, 8). It may be also noted that the stepped expansion of plasma jet passage downstream of an anode arc root attachment may be used for other plasma spray processes/torches and not the plasma jet configurations specifically described herein. In this case the expansion may be arranged at a distance of about (1-2)Da downstream of arc root preferable attachment area.

Figure 9A:
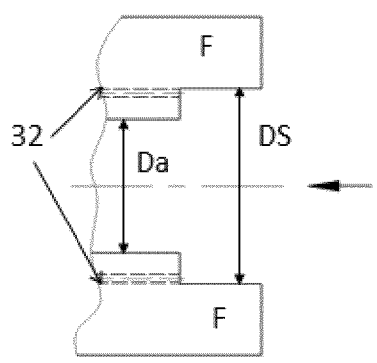
FIGS. 9 *a-b* illustrate axial feeding of additional gases into the stepped expansion of the plasma jet passage.
Figure 9B:
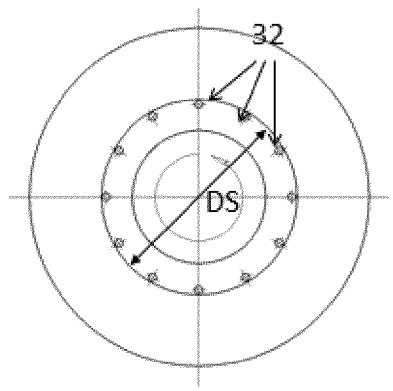

Feeding of additional gases into the stepped expansion may also assist formation of a desirable plasma jet parameters and further decrease the tangential component of plasma velocity. FIG. 9 illustrates an option when additional gases may be fed through multiple gas passages 32 located axially to plasma jet. FIG. 10 illustrates radial gas passages 34 for feeding of additional gases and providing them with a swirl which may have a direction contrary to the plasma jet swirl generated by G1 and G2.

6: Deflection Jet

A plasma apparatus consistent with the present disclosure may generate a plasma jet having a high specific power and temperature. In some cases, high plasma temperature and specific power may result in undesirable overheating a substrate being spray coated with the plasma apparatus. For example, it may happen when short spray distance must be used for spraying due to a confined space. Overheating of the substrate may produce stress in the coating and/or defects related to agglomeration of fine particles, e.g., having a size below about 5-10 micrometers, as well as various other defects. Generally, such defects may be described as "lamps" or "bumps". It may be also noted that in a case of metallic alloy coatings spraying high plasma enthalpy and temperature may also result in undesirable over-oxidation of the fine particles and resultant excessive amount of oxides in a coating. According to one aspect, overheating a substrate, and the resultant increase in defects, as well as oxides content in metallic coatings may be minimized by employing a deflection gas jet in the region of the coating application.

Figure 11A:
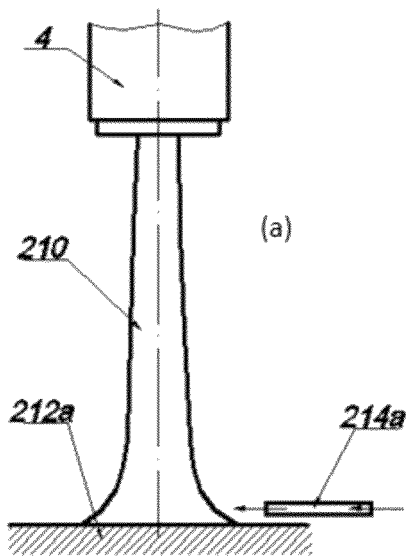
FIGS. 11 *a-c* schematically illustrate various aspects of an embodiment of a plasma jet control system consistent with the present disclosure.
Figure 11B:
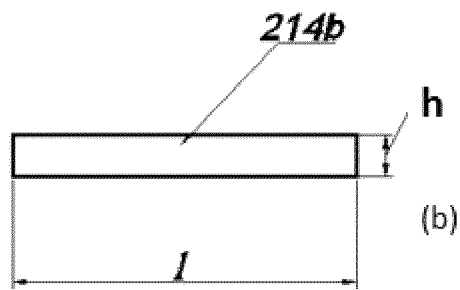
Figure 11C:
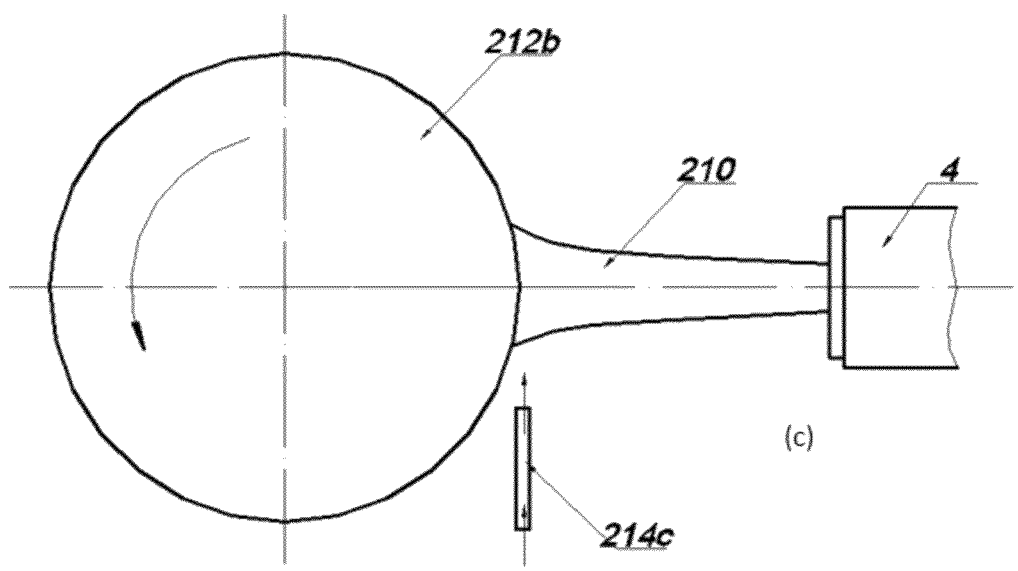

Referring to FIGS. 11 *a-c*, a compressed gas deflection jet may be applied across the plasma jet 210 containing feedstock by a deflection gas nozzle 214a. The gas nozzle 214a may be disposed outside of the spray pattern generated by the plasma apparatus 4 and may be directed generally parallel to the substrate 212a, and/or at a slight angle thereto, in the region of the spray pattern or above it. According to one embodiment, the nozzle 214a may be positioned just outside of the spray pattern, while in other embodiments the nozzle 214a may be located further away from the spray pattern. Different configurations for locating the nozzle 214a and 214c are illustrated in FIGS. 11a, and 11c. The deflection gas nozzle 214 may have a generally rectangular profile, as depicted in FIG. 11b. The nozzle 214 may be wider than the spray pattern produced by the plasma apparatus 4. For example, the nozzle 214 may have a width in the range of about 30-50 mm for a spray pattern in the order of 25 mm wide. In one embodiment, the height h of the nozzle 214b may be in the range of about 1-4 mm. The compressed gas of the deflection jet may be air, nitrogen, etc., and may be supplied at a pressure on the general order of around 3-6 bars. The deflection gas jet may deflect the plasma jet 210 generated by the plasma apparatus 4, along with any fine particles, for example particle having a size less than about 5-10 microns. Larger particle may have sufficient mass, and therefore inertia, to pass through the deflection jet without being substantially deflected.

The above description of the plasma spraying system may now be provided in a more detailed apparatus form that is entirely consistent with the disclosure and description above in FIGS. 3-11.

Figure 12:
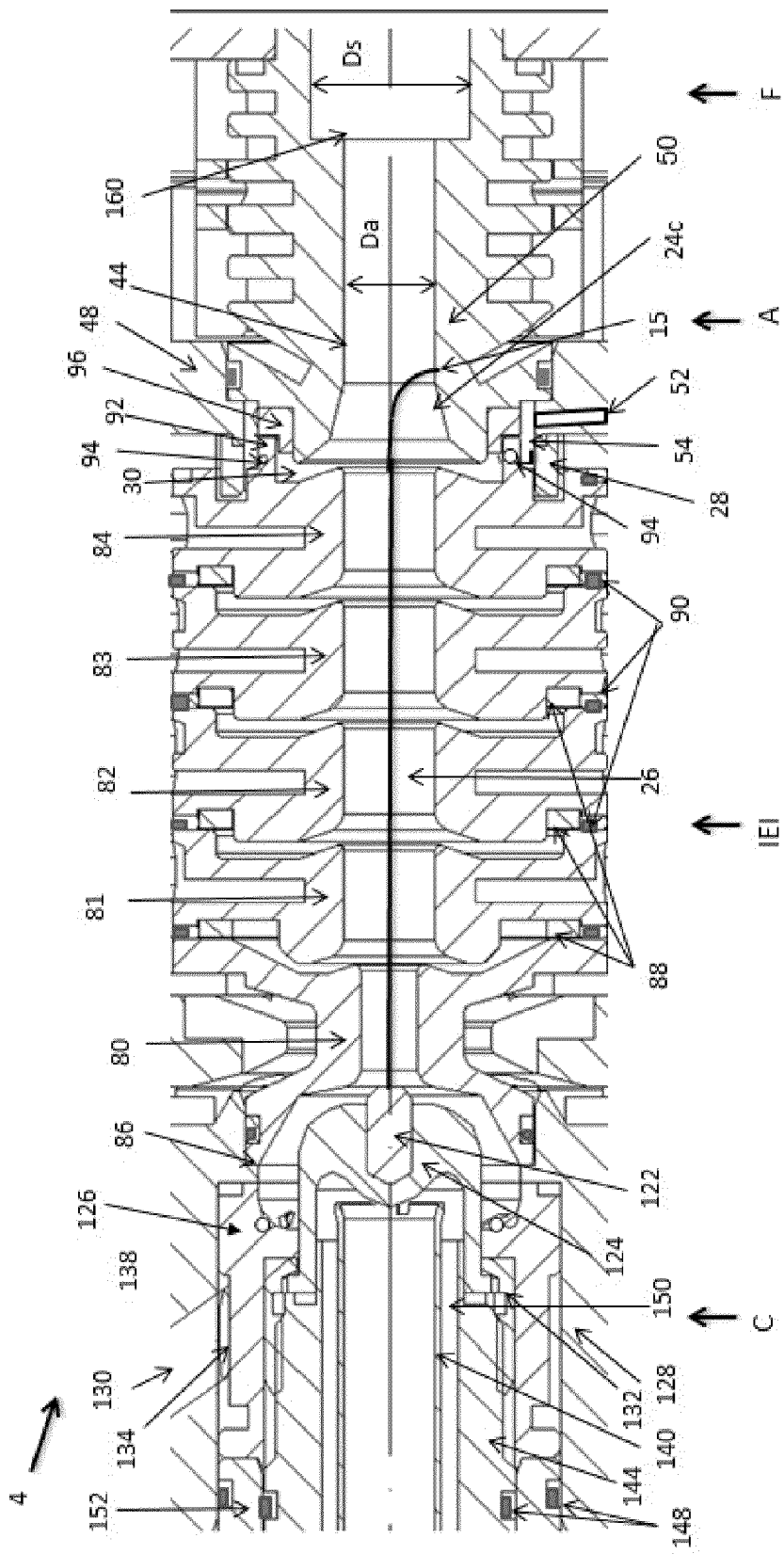
FIG. 12 illustrates a possible embodiment of an apparatus.

Attention is therefore now directed to FIG. 12. Cathode Module C may have a cathode base 124 with cathode insert 122, cathode housing 128, cathode holder 144, cathode nut 132, and cathode vortex distributor 126. Cathode base 124 may be made of high conductivity material, e.g. copper or copper alloy. Cathode base 124, cathode 122 and cathode nut 132 may have electrical contact with cathode holder 144. Cathode holder 144 may be connected to a negative terminal of a DC power source shown on FIG. 3. Pilot insert 80 may have an electrical contact 86 with cathode housing 128 which during ignition may be connected to a positive terminal of a DC through a resistor 18 and switch 14 shown on FIG. 3. Cathode housing 128 and cathode holder 144 may be electrically insulated from each other by cathode insulator 152

Cathode housing may have a gas passage 130 to feed G1 portion of a plasma gas. The gas passage 130 may be connected with cathode vortex distributor 126 having a circular gas receiver 134 connected with radial multiple gas passages 146 which, in turn, are connected to corresponding axial passages 136. Each axial passage 136 may be connected with the vortex holes 138. Sealing O-rings 148 may be used to seal the gas passages.

Figures 13A, 13B:
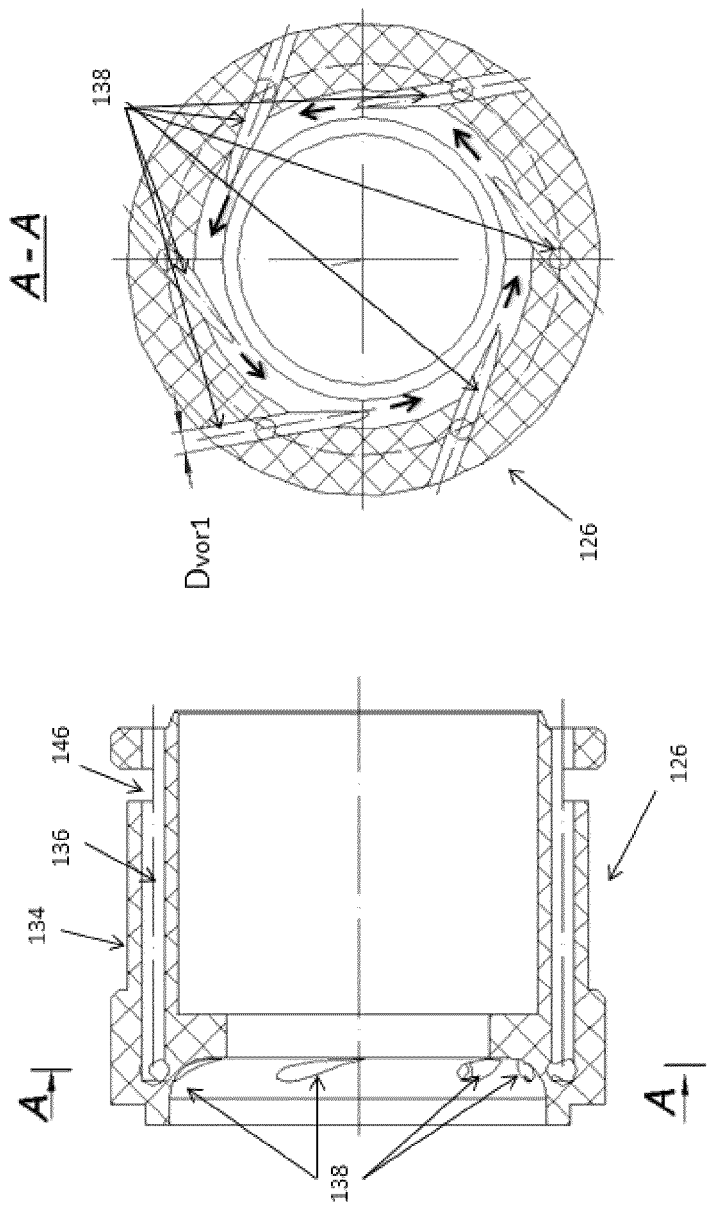
FIGS. 13 *a-b* illustrate cathode vortex distributor.

FIGS. 13 *a-b* illustrate additional features of an embodiment of cathode vortex distributor 126 having 6 holes. The amount of holes (more than 3 at a minimum) and their diameters may be used to control the vortex intensity Vort1 and to adjust it satisfying requirements disclosed above. For example, using six holes as a representative case, the diameter of the vortex Dvor1=0.8 mm and surface area S1 is approximately 3 mm$^2$. Thus, this vortex distributor may be used for G1>0.3 g/sec. The G1 top limit depends on a sonic velocity as was mentioned above and may be estimated for each particular plasma gas. For example, at room temperature sonic velocity and density for nitrogen are about 334 m/sec and 1.165 kg/m3. Thus, in accordance with the disclosure range of nitrogen flow rate through surface area 3 mm$^2$ may be estimated at approximately 15-60 L/min. For other ranges of vortex gas flow amount and/or diameter of vortex holes in the cathode, the vortex distributor 126 may be adjusted accordingly.

An inter-electrode inserts module may consist of a pilot insert 80 and one or more neutral inserts. Four neutral inserts 81-84 may be used in the depicted embodiment. Inserts 81-84 may have the same diameter as shown on FIG. 12. Diameters of neutral inserts may also increase downstream as shown on FIG. 4 providing plasma passage profile and related independent plasma velocity control. The neutral inserts may be electrically insulated from each other and from pilot insert 80 by a set of ceramic rings 88 and sealing O-rings 90.

Generally, the amount of inserts may be changed providing different plasma voltage ranges and satisfying other possible requirements. For example, only inserts 81 and 84 may be used in the embodiment if the torch length needs to be shortened. For $N_2$ plasma having G1=0.58 g/sec≈30 L/min, G2=0.29 g/sec≈15 L/min≈ and operating at 400 A removal of the middle inserts 82 and 83 results in decreasing of plasma arc passage inside IEI module from about 52.5 mm to about 32.5 mm, related operating voltage decreasing from 201V to 162.5V with the decreasing of the Specific Power (SP) from approximately 92 kJ/g to 74 kJ/g. A requirement to increase SP may be satisfied, for example, by use of 6 neutral inserts with related increasing of operating voltage up to about 240V and specific power up to about 110 kJ/g at the same current and $N_2$ flow rates.

Anode module A may consist of anode housing 48 and anode 50. The anode may have an entrance converging zone 24c connecting with a cylindrical zone 44 having diameter Da. Transition zone 24 in the plasma passage between IEI module and cylindrical part 44 of the anode in this embodiment is formed by anode entrance zone 24c and an expansion zone 30 which is configured as a discontinuity in plasma passage 26. Downstream neutral insert 84 may have a circular lip 92 protruding into expansion zone 30 and having G2 vortex orifices 94 connected with circular gas distributor 54 and forming Vort2 in the transition zone. G2 plasma gas is fed into gas passage 52 located in anode housing 48 and connected with circular gas distributor 54 formed by ceramic ring insulator 28 and additional insulating ceramic ring 96. It may be noted that the position of vortex orifices may be changed for the anode entrance zone by just modification of ceramic rings 28 and 96.

FIGS. 14 a-b illustrate more features of an embodiment of downstream neutral insert 84 having 6 vortex holes having diameter Dvor2. The amount of holes and their diameters may be used to control the vortex intensity Vort2=G2/S2 and to adjust the vortex intensity to satisfy the requirements disclosed above. For example for six holes having diameter Dvor2=0.6 mm surface area S2 is approximately 1.7 mm². Thus, in accordance with a requirement 0.4 g/((sec)(mm²)) >Vort2>0.1 g/((sec)(mm²)) disclosed above, this vortex distributor may be used for gas flows G2 within 0.68 g/sec>G2>0.17 g/sec. Thus, nitrogen flow rate in this case may be estimated within 8.6-34.5 L/min. For other ranges of G2 vortex gas flow amount and/or diameter of vortex holes may be adjusted accordingly. It may be noted that in this embodiment DG2 is about 19 mm. Thus, it may be utilized for a significant range of DN for up to DN=16-17 mm providing a wide range of plasma velocity control A plasma forming means (F) in this embodiment are not electrically insulated from the anode and may include the abrupt stepped expansion 160 having diameter Ds. which may be located downstream of anode arc root attachment 15.

The feedstock feeding module is not illustrated in FIG. 12 for clarity purposes. However, widely available powder injectors and powder injector holders manufactured by various third parties may be adopted for this embodiment.

Multiple trials have been performed for the method and apparatus described herein. It was confirmed that the torch generates unique extremely stable plasmas having specific power within 43-140 kJ/g having more than 50 vol. % of molecular gases. However, it should be noted that in the context of the present invention, the plasmas may have specific powers of any one or more of the individual numerical value in this range, such as 43 kJ/g, 44 kJ/g, 45 kJ/g, 46 kJ/g, 47 kJ/g, etc., 48 kJ/g, 49 kJ/g, 50 kJ/g, 51 kJ/g, 52 kJ/g, 53 kJ/g, 54 kJ/g, 55 kJ/g, 56 kJ/g, 57 kJ/g, 58 kJ/g, 59 kJ/g, 60 kJ/g, 61 kJ/g, 62 kJ/g, 63 kJ/g, 64 kJ/g, 65 kJ/g, 66 kJ/g, 67 kJ/g, 68 kJ/g, 69 kJ/g, 70 kJ/g, 71 kJ/g, 72 kJ/g, 73 kJ/g, 74 kJ/g, 75 kJ/g, 76 kJ/g, 77 kJ/g, 78 kJ/g, 79 kJ/g, 80 kJ/g, 81 kJ/g, 82 kJ/g, 83 kJ/g, 84 kJ/g, 85 kJ/g, 86 kJ/g, 87 kJ/g, 88 kJ/g, 89 kJ/g, 90 kJ/g, 91 kJ/g, 92 kJ/g, 93 kJ/g, 94 kJ/g, 95 kJ/g, 96 kJ/g, 97 kJ/g, 98 kJ/g, 99 kJ/g, 100 kJ/g, 101 kJ/g, 102 kJ/g, 103 kJ/g, 104 kJ/g, 105 kJ/g, 106 kJ/g, 107 kJ/g, 108 kJ/g, 109 kJ/g, 110 kJ/g, 111 kJ/g, 112 kJ/g 111 kJ/g, 112 kJ/g, 113 kJ/g, 114 kJ/g, 115 kJ/g, 116 kJ/g, 117 kJ/g, 118 kJ/g, 119 kJ/g, 120 kJ/g, 121 kJ/g, 122 kJ/g 123 kJ/g, 124 kJ/g, 125 kJ/g, 126 kJ/g, 127 kJ/g, 128 kJ/g, 129 kJ/g, 130 kJ/g, 131 kJ/g, 132 kJ/g, 133 kJ/g, 134 kJ/g, 135 kJ/g, 136 kJ/g, 137 kJ/g, 138 kJ/g, 139 kJ/g and 140 kJ/g. For example, one may have specific powers of 50 kJ/g-140 kJ/g, or 60 kJ/g-140 kJ/g, or 70 kJ/g-140 kJ/g, or 80 kJ/g-140 kJ/g or 90 kJ/g-140 kJ/g, 100 kJ/g-140 kJ/g, 110 kJ/g-140 kJ/g, 120 kJ/g-140 kJ/g, and 130 kJ-140 kJ/g.

Accordingly, reference to a stable plasma herein may be understood as: 1. No drifting or variations of average voltage above 1-2% of setup values during the life of the electrodes where the electrodes may have a lifetime of 30 hours, 40 hours, 50 hours, etc., depending upon the level of specific power; and (2) No high frequency (on kHz level) pulsing of plasma voltage of more than ±10 V.

During the trials long term variations of average torch voltage were mainly observed on a level below 1%. Several observed variations on a level of 1-2% may be attributed to unavoidable minor variations of plasma gas flow due to ±1% accuracy of mass flow controllers used. High frequency pulsing of plasma voltage was on a negligible level below 5-10 V which resulted in homogeneous treatment of feedstock, high deposit efficiency and deposit quality. Durability trials showed long life of electrodes. For example, at SP of about 45-75 kJ/g life of electrodes may be estimated on a level of 80-100 hours or above. At SP of about 80-95 kJ/g life of electrodes may be estimated on a level above 40-50 hours or above.

It may be also noted that the disclosed embodiment showed simultaneous capability of generating relatively low specific power stable plasmas having SP<43 kJ/g.

The method and apparatus described herein may used to apply coatings on a variety of substrates. These may include, e.g. power generating components which may be understood as any component used in a device for the generation of power. This may therefore include blades, vanes, combustors, liners, etc. One may also utilize the method and apparatus herein for coating of chambers which are used for application of vapor deposition materials.

Table 1 contents examples of parameters used to deposit different coatings based on the disclosed method and apparatus herein. High deposit efficiency as well as superior quality of coatings was observed. Some of the significant observations were as follows.

Example 1 is related to $Cr_2O_3$ coatings sprayed by a powder manufactured by HC Starck and demonstrated high microhardness of about HV 1400-1500.

Example 2 is related to NiCrAlY coatings which demonstrated extremely low oxides content and permeability and, therefore, high corrosion resistance. It may be noted that application of a deflection jet in this case resulted in the further decreasing of oxides content and permeability. The deflection nozzle was 40 mm wide with a height of about 2.5 mm and was located 80 mm downstream of a powder injector. Compressed nitrogen at pressure of about 4 bars was used for the deflection jet. Spray distance was 110 mm.

Examples 3-5 are related to thermal barrier porous coatings sprayed by spray-dry and sintered ZrO2-8% Y2O3 powder (ZRO-182 manufactured by Praxair). All coatings demonstrated pronounced porosity with average pores size of about 4-8 microns. Total porosity of the coatings was as follows: coating #3—28-30%; coating #4—33-35%; Coating #5—16-18%.

Examples 6-7 are related to thermal barrier dense coatings having vertical cracks and sprayed by fused and crashed powder PC-YZ8t manufactured by St. Gobain. It may be noted that coating #7 demonstrated higher density of vertical cracks due to higher specific powers.

It may be noted that plasma coatings are, as a rule, sprayed by multiple passes of plasma torch relatively spraying surface. Therefore, a coating may consist of multiple layers and each of them may be sprayed at different conditions and/or by different feedstock thus satisfying specific requirements to the coating structure, composition and performance. For example, thermal barrier coating (TBC) may consist of a metallic bond coat (BC) and ceramic top coat (TC) and each of them may have multiple layers sprayed by multiple plasma torch passes. Each layer may generally have a thickness of about 10-50 microns. Thus, total coating having thickness, for example, 500 microns may be sprayed by 10-50 passes and has, consequently 10-50 layers. It may be noted that high SP molecular plasmas may be needed only to spray some layers. For example, SP>43 kJ/g may be needed only to spray first layer or layers of a BC providing a good bonding and interface with a substrate. Another example may be TC coating having a pronounced porosity and sprayed by big ceramic particles having average size 60-100 microns which may also need SP>43 kJ/g. It may be noted that some layers may be sprayed by different methods. For example, some BC layers may be sprayed by Low Pressure Plasma Spraying (LPPS) or by High Velocity Oxygen Fuel (HVOF) processes. Thus, the disclosed method may be applied to just selected layers of a total coating.

What is claimed is:

1. A plasma torch for depositing a coating at a voltage (U) above 100 V and current (I) below 500 A comprising:
   a cathode electrode, an anode module having an anode electrode having an anode axis, entrance zone and a cylindrical portion having diameter Da wherein said plasma torch generates a plasma arc having an anode arc root attachment inside said anode;
   a plasma jet forming module located downstream of said anode arc root attachment which forming module controls one or more parameters of the plasma jet in said module;
   an interelectrode module controlling said plasma arc passage between said cathode and said anode having one end adjacent said cathode module and a second end adjacent said anode module and having a pilot insert adjacent to said cathode;
   at least one neutral inter-electrode insert;
   said plasma torch further comprising two passageways to feed plasma gas in a total amount G wherein said plasma gas comprises more than 50 vol. % of molecular gas;
   wherein (U)(I)/(G) is in the range of 43 kJ/g-140 kJ/g;
   wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;
   wherein one of said passageways for feeding plasma gas comprises a second plasma gas passage located between said interelectrode module and said cylindrical part of anode for feeding plasma gas in an amount G2;
   wherein said gas is directed through a plurality of orifices having a surface area S2 wherein a vortex is formed having a vortex intensity Vort2=G2/S2; and
   wherein G1 is greater than 0.6G and Vort1=G1/S1 is greater than 0.1 g/((sec)(mm$^2$)) and wherein said Vort2 is greater than 0.1 g/((sec)(mm$^2$)) and smaller than 0.4 g/((sec)(mm$^2$)).

2. The apparatus of claim 1 wherein said plurality of orifices having a surface area S2 locate on diameter at least 2 mm greater than said Da.

3. The apparatus of claim 1 wherein length of said anode entrance zone is (0.5-1.5) of said Da.

4. The apparatus of claim 1 wherein said inter-electrode module has a plurality of said neutral inter-electrode inserts, each having a diameter, which defines said plasma arc passage.

5. The apparatus of claim 4 wherein said plurality of neutral inter-electrode inserts provides a plasma arc passage of increasing diameter.

6. The apparatus of claim 4 wherein said plurality of neutral inter-electrode inserts defines a plasma arc passage of constant diameter.

7. The apparatus of claim 1 including a neutral inter-electrode insert positioned adjacent said anode wherein such insert has a diameter value of (0.8-1.25)Da.

8. The apparatus of claim 1 wherein said forming module has a forming nozzle providing a stepped expansion of the plasma jet passage from sad diameter Da to diameter Ds and wherein (Ds-Da)/2 is within (0.2-0.6)Da, wherein (0.2-0.6)Da=δ, wherein δ is the expansion ratio.

9. The apparatus of claim 8 wherein said stepped expansion is defined by said expansion ratio δ and an expansion angle α and α has a value of 8° to 25°.

10. The apparatus of claim 9 wherein a has a value of 10° to 18°.

11. The apparatus of claim 8 wherein said stepped expansion is positioned within 45° to 80° of said anode axis.

12. The apparatus of claim 1 wherein said feedstock module is configured to feed feedstock in the form of powder.

13. The apparatus of claim 1 wherein said feedstock module is configured to feed feedstock that at least partially contains a liquid.

14. The apparatus of claim 1 wherein a compressed gas deflection jet is applied across said plasma jet containing said feedstock.

15. The apparatus of claim 1 wherein said molecular gas is nitrogen.

* * * * *